FM STEREO MULTIPLEX RECEIVER HAVING
STEREOPHONIC INDICATING MEANS
Filed March 18, 1965

Inventor
Leslie P. Golonski
By Mueller & Aichele
Attys.

3,293,366
Patented Dec. 20, 1966

3,293,366

FM STEREO MULTIPLEX RECEIVER HAVING STEREOPHONIC INDICATING MEANS

Leslie P. Golonski, Hanover Park, Ill., assignor to Motorola, Inc., Franklin Park, Ill., a corporation of Illinois Filed Mar. 18, 1965, Ser. No. 440,774
7 Claims. (Cl. 179—15)

Figures 1, 2:
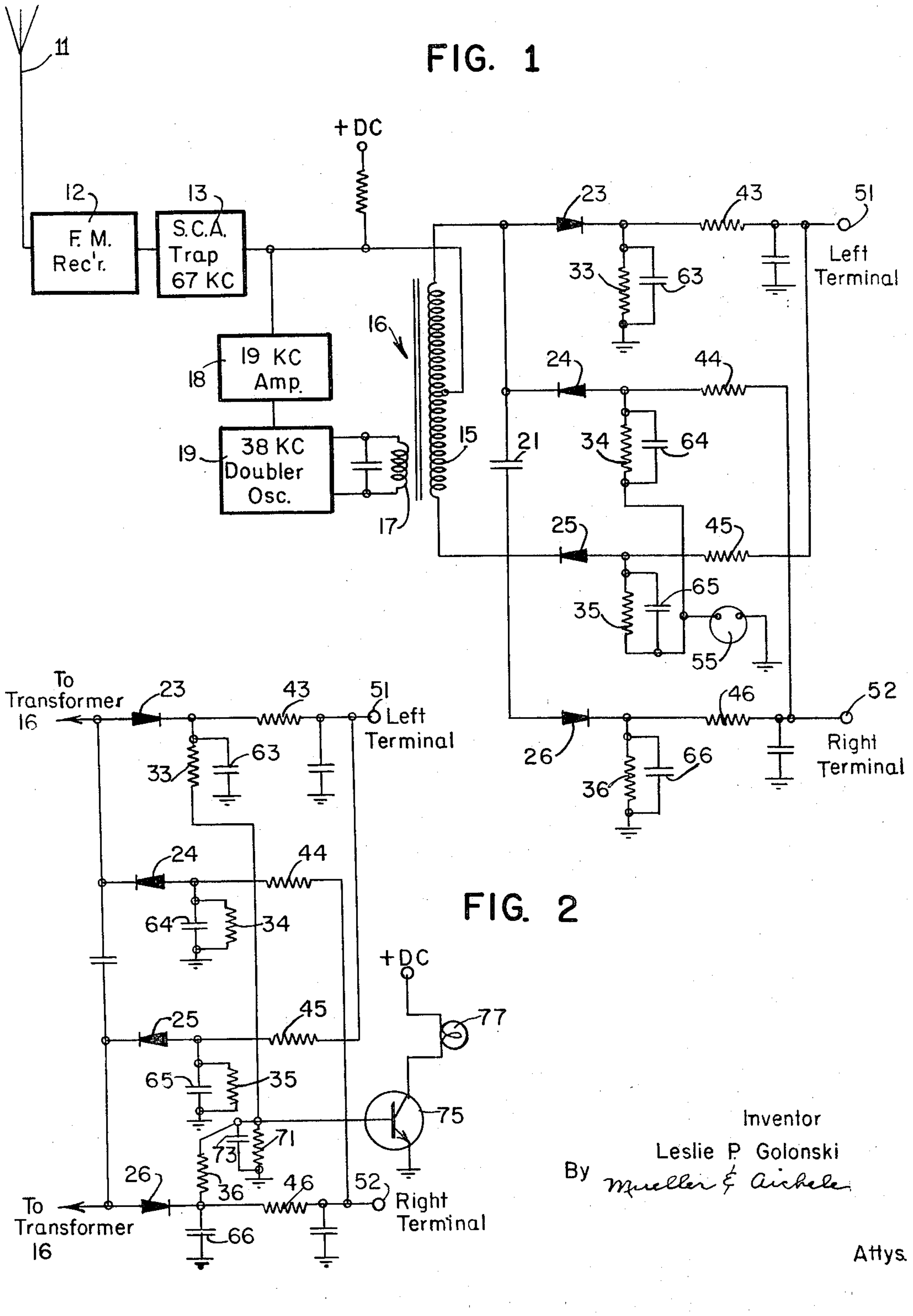

This invention relates to frequency modulation receivers, and more particularly to a circuit in such a receiver for indicating that stereophonic signals are being received.

In many frequency modulation receivers providing both monophonic and stereophonic reception, and indicator is used to inform the listener whether monophonic signals or stereophonic signals are being received. Some indicator systems incorporate a light, such as a neon lamp, which is energized in the presence of stereophonic signals. Other systems utilize a meter movement as an indicator of the presence of stereophonic signals. Both types of systems usually incorporate an independent amplifying stage which utilizes either the 19 kc. multiplex pilot signals or the 38 kc. restored sub-carrier signals to drive the indicator. Either of these signals are available in the circuit whenever stereophonic signals are being received when standard multiplexing techniques are used. Such indicator systems as above described may be dependent upon circuit components such as tuned circuits which are utilized for other purposes in the system and consequently the addition of indicating circuitry may have adverse effects on the parameters of the receiver circuitry.

It is an object of this invention to provide an improved system in a frequency modulation receiver for indicating that stereophonic signals are being received.

Another object of the invention is to provide an indicator system for a frequency modulation multiplex receiver which system utilizes a minimum number of components and which does not adversely affect the circuit parameters of the receiver.

A feature of the invention is the provision of an indicating device connected in an envelope detector circuit of a frequency modulation multiplex receiver to utilize the presence of switching signals for indicating that stereophonic signals are being received.

Another feature of the invention is the provision, in a frequency modulation receiver, of an indicator connecting the load resistors of two commonly poled diodes in an envelope stereo detector circuit to a reference potential.

In the drawings:

FIG. 1 is a schematic diagram of a frequency modulation multiplex receiver constructed in accordance with the invention; and FIGURE 2 is a schematic diagram illustrating another embodiment of the invention.

In a frequency modulation multiplex receiver constructed in accordance with the invention, receiving and detecing circuitry is provided which is responsive to reception of frequency modulated carrier signals to derive stereophonic and monophonic signals. An envelope detector circuit is connected to the output of the receiving and detecting circuits for passing monophonic audio frequency signals substantially free of distortion, and for translating stereophonic signals to develop separated right and left stereophonic signals. An oscillator or frequency multiplier circuit is connected to the envelope detector circuit to supply switching signals thereto when stereophonic signals are being received. The envelope detector circuit includes rectifiers which produce a direct current potential in response to the switching signals applied thereto from the frequency multiplier or oscillator. The invention makes use of such potential to operate a visual indicator when stereophonic signals are being received.

More particularly, the invention utilizes a meter connecting the load resistor of two commonly poled diodes in the envelope detector circuit to a reference potential. The envelope detector circuit includes diodes connected with polarities to conduct on opposite phases of the switching signals. In such circuitry, rectified signals will therefore appear at these diodes and such signals are utilized through load resistors to operate the meter. Alternatively, a transistor can be connected to be controlled by the rectified switching signals and operate an indicator light.

Referring now to the drawing, the schematic diagram of a stereophonic multiplex receiver in FIG. 1 illustrates a particular form of the invention. Signals received by antenna 11 are coupled to frequency modulation receiver circuitry 12 wherein audio frequency signals are derived from the frequency modulated received carrier. As is standard broadcast procedure in the United States, when signals carrying stereophonic information are received, the stereophonic signals appearing at the the output of the receiver 12 include sum signals composed of the sum of right and left stereo signals, and difference signals composed of a suppressed sub-carrier wave amplitude modulated by the difference between right and left stereo signals. Such signals may also include modulated sub-carriers of higher frequency for additional communication channels, for example, a sub-carrier centered at 67 kc. The trap 13 removes this high frequency sub-carrier from the signals at the output of receiver 12. When signals carrying monophonic information are received, the receiver and detector circuitry 12 derives monophonic signals at audio frequency, as is known in the art.

The output of trap 13 is connected through the center tap of secondary winding 15 of transformer 16 to an envelope detector circuit. In addition, when multiplex signals are present, the 19 kc. sub-carrier is selected and amplified by amplifier 18 and applied to a doubler oscillator 19. Doubler oscillator 19 is coupled to the primary winding 17 of transformer 16 and the 38 kc. signals developed in secondary winding 15 are utilized as switching signals by the envelope detector circuit.

The envelope detector circuit comprises a pair of rectifying circuits, each coupled to a respective end of secondary winding 15 and each being connected to the other by a capacitor 21. One rectifying circuit includes diodes 23 and 24 connected with opposite polarities to conduct on opposite phases of the switching signals. Similarly, the other rectifying circuit includes a pair of diodes 25 and 26, also connected with opposite polarities, to conduct on opposite phases of the switching signals. Load resistors 33, 34, 35 and 36 are connected to respective ones of diodes 23, 24, 25 and 26 and each forms a load for the respective diode with which it is associated.

As is well known in the art, diodes 23, 24, 25 and 26 when switched in proper phase by the switching signals, develop the separated right and left stereo signals. Thus diodes 23 and 25 in the drawing serve to develop the left stereo signal which is applied through resistors 43 and 45 respectively to the left channel output terminal 51. Similarly, the right stereo channel signals are developed by diodes 24 and 26 and are applied through resistors 44 and 46 respectively, to the right stereo output terminal 52.

When the receiver is tuned to a station broadcasting monophonic information, these signals must pass through the diodes 23–26 of the envelope detector. In order for this to occur without excessive distortion, a positive D.C. bias is applied so that two of the diodes are always in a linear conduction region of their characteristic curve under signal conditions of monophonic broadcast. It should be noted that since there are two linear portions of a conventional diode characteristic curve, a negative D.C. bias holding the diode in the linear portion of the negative part of its characteristic curve would also work. Thus, under monophonic reception conditions, the D.C. voltage across resistor 33 and resistor 36 might be of the order of +1.8 volts. Under the same conditions the voltage drop across the grounded resistors 34 and 35 might approximate +.9 volt.

During stereophonic reception, however, the 38 kc. output developed in doubler oscillator 19 must be sufficient not only to overcome the stereophonic signals, but must also overcome any forward bias on the diodes 23–26 in order for proper switching to occur. Thus, satisfactory operation might develop a D.C. voltage across resistors 33 and 36 of the order of +6.8 volts and across resistors 34 and 35 of the order of —4.1 volts. Actually, any voltages might be satisfactory at the foregoing points, during stereophonic reception, so long as they are considerably greater than the signal plus the forward bias. This therefore will ensure switching action of the diodes.

This invention takes advantage of the fact that the voltages across the respective load resistors change substantially when stereophonic signals are being received. A microammeter 55 connects resistors 34 and 35 to a reference potential. In the absence of stereophonic signals, the microammeter will indicate the current through resistors 34 and 35 due to the forward bias on respective diodes 24 and 25. When stereophonic signals are received, as stated before such bias changes radiacally and, in fact, may actually reverse polarity as in the example voltages. This change is indicated by the microammeter 55, thus providing an indication that stereophonic multiplex signals are being received. The current is sufficient that no amplification is necessary.

It is possible, within the scope of this invention, to utilize other points in the circuitry wherein the voltage across the load resistors in the presence of rectified demultiplexing signals is different from that under normal D.C. bias in the absence of such signals. In the embodiment shown in the drawing, two of the resistors are connected through the microammeter to the reference potential in order to get greater current through the meter. Alternatively, only one resistor might be connected to the microammeter.

Referring now to FIG. 2, an alternative form of the invention is shown. Components having identical values and functions are given identical numeration in FIG. 2. In this embodiment of the invention, a resistor 71 and a capacitor 73 are connected in parallel with each other and connect resistors 33 and 36 to ground. Elements 33, 36, 71 and 73 thereby form a voltage divider to which the base portion of an NPN transistor 75 is connected. In the presence of rectified switching signals, a positive voltage will be applied to the base of transistor 75, turning the transistor on. A light bulb 77 is connected in series with the emitter-to-collector path of transistor 75 across a source of D.C. potential. Thus, in the presence of stereophonic signals which produce switching signals in the envelope detector, the rectified switching signals cause a voltage to be produced in the voltage divider. This in turn switches transistor 75 on to illuminate bulb 77 and indicate that stereophonic signals are being received.

Practical operating circuits have been constructed with components of the following values:

Resistors 33, 34, 35 and 36—180K
Resistors 43, 44, 45 and 46—100K
Capacitors 63, 64, 65 and 66—220 microfarads In the circuit of FIG. 1, the voltages previously suggested resulted when the voltage at the center tap of secondary winding 15 was +2 volts and the voltage of the switching signals was +4 volts. In the FIG. 2 version, capacitor 73 was .05 microfarad and resistor 71 was 470K. Transistor 75 was Motorola type 48 S 134768 and the bulb 77 had a 10 volt, 15–20 ma. rating. The values of resistors 33–36 are normally sufficiently high that the circuit parameters of the receiver are not affected by the addition of the indicator and stereophonic reception is not interefered with. The indicator is at the output end of all the tuned circuits necessary in a stereophonic multiplex receiver, thus providing a maximum rejection of spurious signals without extra circuitry. This high selectivity indicator is readily adaptable to either tube or transistor circuitry.

I claim:

1. A multiplex stereophonic receiver, including in combination, first circuit means responsive to reception of frequency modulated signals to derive audio frequency stereophonic and monophonic signals, second circuit means providing switching signals in response to reception of stereophonic signals, third circuit means connected to said first and second circuit means for passing monophonic signals substantially free of distortion and for translating the stereophonic signals to develop separated left and right stereophonic signals, said third circuit means including rectifier means developing a direct current potential in response to the switching signals applied thereto from said second circuit means, and indicator means coupled to said rectifier means and responsive to the direct current potential developed thereby to indicate that stereophonic signals are being received by said receiver.

2. A multiplex stereophonic receiver including in combination, first circuit means responsive to reception of frequency modulated multiplex signals to derive audio frequency stereophonic and monophonic signals, second circuit means providing switching signals in response to reception of stereophonic signals, third circuit means connected to said first and second circuit means for passing monophonic signals substantially free of distortion and for translating the stereophonic signals to develop separated right and left stereophonic signals, said third circuit means including rectifier means and resistor means forming a load therefor, said rectifier means developing a direct current potential on said resistor means in response to switching signals applied to said rectifier means from said second circuit means, and indicator means connecting said resistor means to a reference potential and responsive to the direct current potential developed thereon by said rectifier means to indicate that stereophonic signals are being received by said receiver.

3. A multiplex stereophonic receiver including in combination, first circuit means responsive to reception of a carrier signal frequency modulated by stereophonic signals to derive sum signals composed of the sum of right and left stereophonic signals and to derive difference signals composed of a suppressed sub-carrier signal amplitude modulated by the difference between right and left stereophonic signals, said first circuit means being responsive to reception of a carrier signal frequency modulated by monophonic signals to derive monophonic signals, second circuit means providing demodulating signals of suppressed sub-carrier frequency in response to reception of stereophonic signals, third circuit means connected to said first and second circuit means for passing monophonic signals substantially free of distortion and for translating the sum signals and the difference signals and the demodulating signals to develop separated right and left stereophonic signals, said third circuit means including rectifier means rectifying the demodulating signals supplied thereto from said circuit means, and indicator means coupled to said rectifier means and responsive to the presence of rectified demodulating signals at said rectifier means to indicate that stereophonic signals are being received by said receiver.

4. A multiplex stereophonic receiver including in combination, first circuit means responsive to reception of frequency modulated signals to derive audio frequency stereophonic and monophonic signals, second circuit means providing switching signals in response to reception of stereophonic signals, first and second envelope detector means coupled to said first and second circuit means, said detector means each having diodes connected with polarities to conduct on opposite phases of the switching signals, each of said diodes having a resistor connected thereto forming a load for said diode, each of said envelope detector means translating stereophonic signals to develop right stereophonic signals by conduction and non-conduction of said first diode and left stereophonic signals by conduction and non-conduction of said second diode, and direct current responsive indicator means series connected to said resistors connected to said first diode in each of said envelope detector means and providing an indication of stereophonic reception in the presence of the switching signals due to rectification thereof by said diodes.

5. A multiplex stereophonic receiver including in combination, a frequency modulation detector for deriving audio frequency stereophonic and monophonic signals from a frequency modulated carrier signal, an oscillator for producing switching signals of suppressed sub-carrier frequency in response to reception of stereophonic signals, first and second envelope detector means coupled to said frequency modulation detector and said oscillator, each of said envelope detector means having diodes connected with polarities to conduct on opposite phases of the switching signals, each of said diodes having a resistor connected thereto forming a load for said diode, the stereophonic signals being translated in each of said envelope detector means so that the rights stereophonic signal is developed by conduction and non-conduction of said first diode and the left stereophonic signal is developed by conduction and non-conduction of said second diode, and a direct current ammeter series connected with said resistors associated with said second diodes in each of said envelope detector means and providing an indication of stereophonic multiplex reception in the presence of the swtiching signals due to rectification thereof by said diodes.

6. A multiplex stereophonic receiver including in combination, first circuit means responsive to reception of frequency modulated signals to derive audio frequency stereophonic and monophonic signals, second circuit means providing switching signals in response to reception of stereophonic signals, third circuit means connected to said first and second circuit means for passing monophonic signals substantially free of distortion and for translating the stereophonic signals to develop separated left and right stereophonic signals, said third circuit means including rectifier means developing a direct current potential in response to the switching signals applied thereto from said second circuit means, amplifier means coupled to said rectifier means for amplifying the direct current potential developed thereby, and indicator means coupled to said amplifier means to be driven thereby for indicating that stereophonic signals are being received by said receiver.

7. A multiplex stereophonic receiver including in combination, a frequency modulation detector for deriving audio frequency stereophonic and monophonic signals from a frequency modulated carrier signal, an oscillator for producing switching signals of suppressed sub-carrier frequency in response to reception of stereophonic signals, first and second envelope detector means coupled to said frequency modulation detector and said oscillator, each of said envelope detector means having first and second diodes connected with polarities to conduct on opposite phases of the switching signals, each of said first and second diodes having a resistor connected thereto forming a load for said diode, the stereophonic signals being translated in each of said envelope detector means so that the right stereophonic signal is developed by conduction and non-conduction of said first diode and the left stereophonic signal is developed by conduction and non-conduction of said second diode, impedance means series connected with said resistors associated with said second diodes in each of said envelope detector means to form a voltage divider therewith, amplifier means connected to said impedance means for amplifying the signal produced by rectified switching signals, and a light bulb coupled to be driven by said amplifier means to provide an indication of stereophonic multiplex reception.

References Cited by the Examiner

UNITED STATES PATENTS

| | | | |
|---|---|---|---|
| 3,116,372 | 12/1963 | Wolff | 179—15 |
| 3,225,143 | 12/1965 | Parker | 179—15 |

DAVID G. REDINBAUGH, *Primary Examiner.*

R. L. GRIFFIN, *Assistant Examiner.*